(12) United States Patent
Mailand

(10) Patent No.: US 7,631,664 B1
(45) Date of Patent: Dec. 15, 2009

(54) THREADED EXPANSION PLUGS

(75) Inventor: Jason C. Mailand, The Woodlands, TX (US)

(73) Assignee: Tejas Research and Engineering, LP, The Woodlands, TX (US)

( * ) Notice: Subject to any disclaimer, the term of this patent is extended or adjusted under 35 U.S.C. 154(b) by 0 days.

(21) Appl. No.: 12/204,056

(22) Filed: Sep. 4, 2008

(51) Int. Cl.
*F16L 55/10* (2006.01)

(52) U.S. Cl. .................. 138/89; 138/90; 220/234; 29/552.1

(58) Field of Classification Search .......... 138/89, 138/90; 411/3, 4, 45, 69, 72; 220/234, 233
See application file for complete search history.

(56) References Cited

U.S. PATENT DOCUMENTS

| | | | | | |
|---|---|---|---|---|---|
| 1,675,143 | A | * | 6/1928 | Shrum ..................... 138/96 T |
| 2,770,260 | A | * | 11/1956 | Henderson ................ 138/89 |
| 2,821,323 | A | * | 1/1958 | Lee, II ..................... 220/233 |
| 3,825,146 | A | * | 7/1974 | Hirmann ................... 220/234 |
| 4,549,337 | A | * | 10/1985 | Newell et al. ............ 29/527.4 |
| 4,867,333 | A | * | 9/1989 | Kolp et al. ............... 220/234 |
| 5,042,679 | A | * | 8/1991 | Crowson et al. ......... 220/259.3 |
| 5,078,294 | A | * | 1/1992 | Staubli ..................... 220/233 |
| D331,064 | S | * | 11/1992 | Wilson et al. .............. D15/5 |
| 5,160,226 | A | * | 11/1992 | Lee, II ..................... 411/72 |
| 5,499,892 | A | * | 3/1996 | Reed ........................ 411/5 |
| 5,779,085 | A | * | 7/1998 | Havlinek et al. .......... 220/234 |
| 5,944,057 | A | * | 8/1999 | Pierce ..................... 138/89 |
| 6,003,557 | A | * | 12/1999 | Brelig et al. ............. 138/89 |
| 6,604,882 | B2 | * | 8/2003 | Gordon et al. ............ 403/2 |
| 6,966,342 | B2 | | 11/2005 | Denham ..................... 138/89 |
| 7,011,315 | B2 | | 3/2006 | Czaplicki et al. .......... 277/628 |
| 7,159,837 | B2 | | 1/2007 | Richards ................... 249/209 |

* cited by examiner

*Primary Examiner*—Patrick F Brinson
(74) *Attorney, Agent, or Firm*—Claude E. Cooke, Jr.; Burleson Cooke L.L.P.

(57) ABSTRACT

A plug for sealing a bore in the wall of a high-pressure fluid container is provided. The plug includes a sloping surface adapted to seal at an edge between surfaces of different diameter. A method for sealing the bore by forming a socket in the wall that is adapted to receive the plug is provided. The socket may be formed by reaming a tapered hole to form a surface having a minimum diameter greater than the diameter of the bore and tapping a segment of the tapered hole. A ball may be forced into a cup of the plug to increase radial force between the plug and the socket.

7 Claims, 4 Drawing Sheets

THREADED EXPANSION PLUGS

BACKGROUND OF THE INVENTION

1. Field of the Invention

This invention generally relates to plugs for pressure bodies; more specifically it relates to threaded expansion plugs.

2. Description of Related Art

It is often necessary to seal cavities or holes made through the wall of pressure vessels. For example, holes are often placed in hydraulic manifolds used in oil and gas wells. Sealing these holes can be accomplished through welding and use of plugs. There are many situations in which welding is undesirable, as it weakens the metal around the weld, or when welding is a safety risk due to the presence of flammable vapors—a common condition in the production of oil and natural gas.

Plugs are a common method of sealing cavities made through the surface of pressure vessels. The "NPT" style plug is commonly used. NPTs have a conical tapered thread to assist in sealing. While useful, the NPT is relatively large, and cannot be used in every application. NPTs are also prone to leakage when installed, as the threads provide the only seal.

Expansion plugs, such as the ball plug commercially available from Farmington Engineering of Madison, Conn., are another sealing solution. The Farmington Plug, viewable at www.farmingtoneng.com, discloses a cylindrical cup having a series of beveled shoulders, a conical closed end, and a ball expansion means secured in the open end of the cup. This plug is placed in an as-drilled hole, requiring no reaming. To seat the plug, the ball is struck with a special tool, forcing the ball further into the cup. The ball is compressed, and provides a radial force that assists in sealing.

U.S. Pat. No. 5,160,226, titled "Tapered Expansion Sealing Plug" discloses a tapered expansion sealing plug. One embodiment, a "pin plug," is a frusto-conical plug body with peripheral U-shaped grooves and a frusto-conical pin expansion means. Another embodiment is a frusto-conical plug body with a ball-shaped expansion means.

Current expansion plugs, whether tapered or cylindrical, have one radial seal to prevent failure. Cylindrical expansion plugs consistently undergo catastrophic failure at high pressure. At 25,000 psi, for example, the plug not only leaks—it becomes a high-velocity projectile, creating an unsafe condition. There is a standing need for plugs that can withstand high pressure.

SUMMARY OF INVENTION

The problem of plug failure at high pressure is solved by a threaded expansion plug having three sealing elements. An end seal provides the main sealing force. The second seal has high-surface area tapered threading to provide maximum radial force in the bore. The third seal is provided by a seated ball, providing a strong band of radial force through expansion of the plug.

BRIEF DESCRIPTION OF THE DRAWINGS

The same numerals designate the same parts in the different figures.

DETAILED DESCRIPTION

Figure 1:
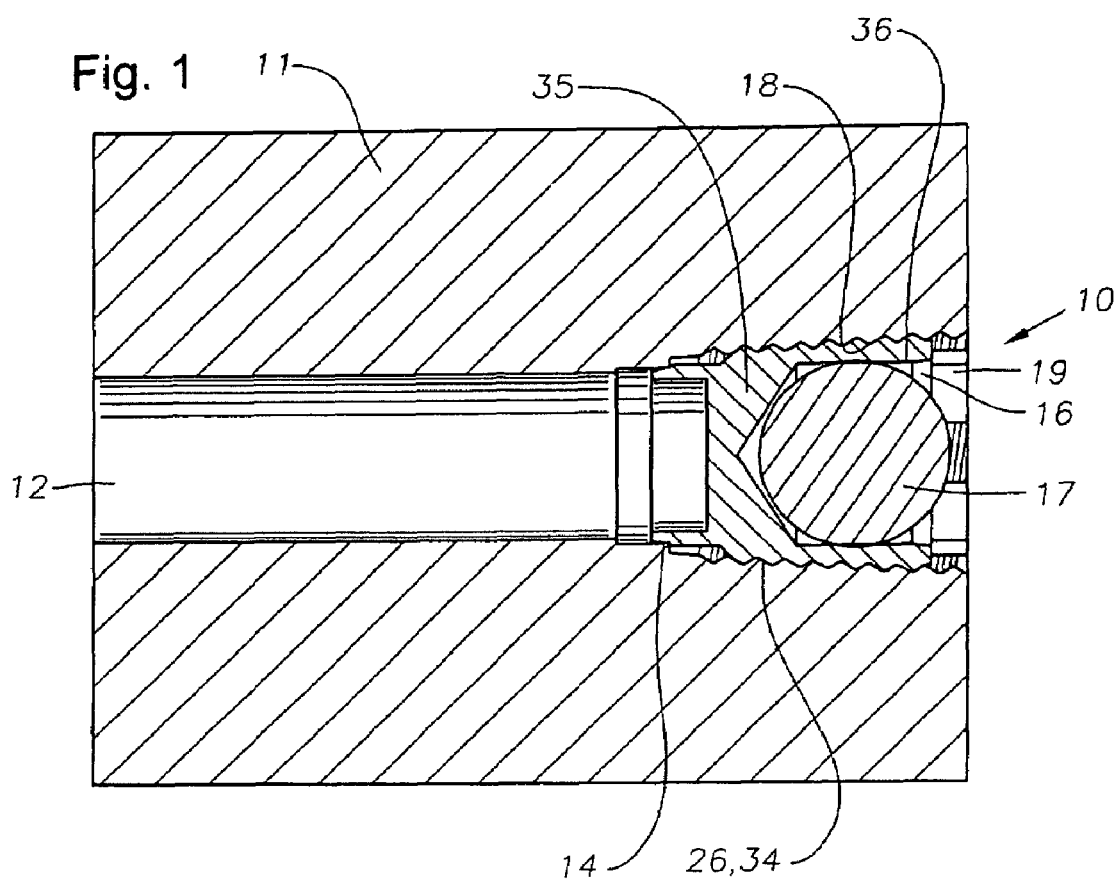
FIG. 1 is a cross-sectional view of one embodiment of a threaded expansion plug disclosed herein installed in a wall of a pressure body.

Referring to FIG. 1, illustrated is threaded sealing plug 10 installed in wall 11 of a pressure body. Bore 12 extends from inside the pressure body to a socket constructed for plug 10, which will be described below. Three seals are formed by plug 10. The first seal is at 14, where a sloping surface of plug 10 in forced against an edge created by a change in diameters of the socket, which will be shown in more detail below. The second seal is created by tapered male threads 34 on plug 10 in tapered female threads 26 of the socket. The third seal is formed by ball 17 forced into cup 36 of plug 10 to create a high stress ring at 18, which expands the wall of cup 36 and male threads 34 radially. Ball 17 may, alternatively, be any body sized to expand the wall of cup 36 radially, including a prolate spheroid. In one embodiment, castle head 19 forms the outward end of plug 10. Castle head 19 is comprised of a plurality of tabs used in inserting plug 10 into female threads 26 (shown in detail in FIG. 2). Ball guide 16 may be a tapered lip used to assist in guiding a ball into outer cup 36.

Figure 2:
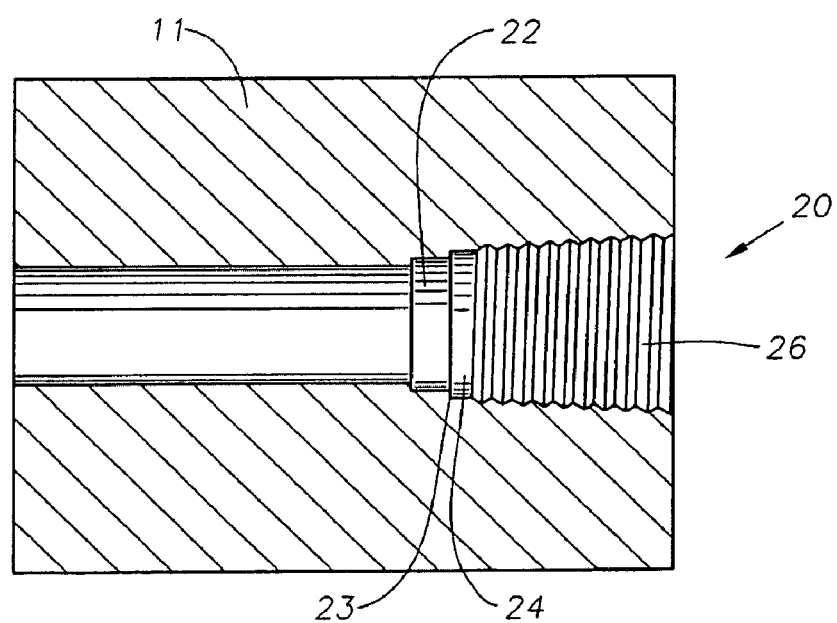
FIG. 2 is a cross-sectional view of a socket for a plug disclosed herein.

Referring to FIG. 2, a cross-sectional view of socket 20 in wall 11 is illustrated. Socket 20 may be made up of: surface 22, which may be cylindrical or tapered, which preferably has a greater diameter than bore 12; tapered surface 24, which has a greater diameter than surface 22 so as to form edge 23 at the intersection of surfaces 22 and surface 24; and tapered threads 26 extending outwardly from tapered surface 24. Socket 20 intersects bore 12 (FIG. 1) in wall 11. Alternatively, surface 22 may be continuous with bore 12.

Figure 3:
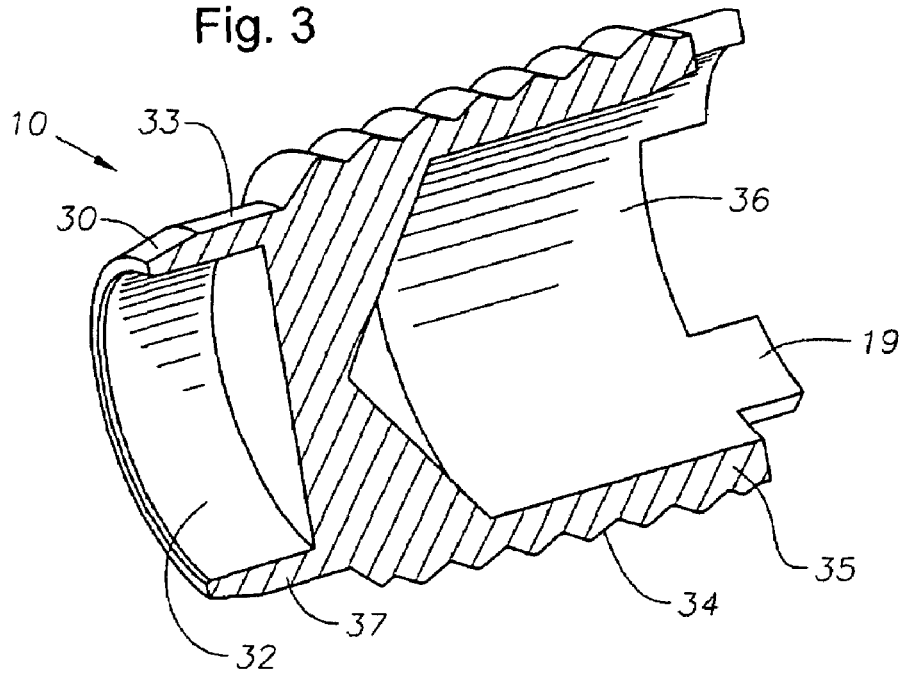
FIG. 3 is a perspective cross-sectional view of one embodiment of a plug disclosed herein.

FIG. 3 is a cross-sectional perspective view of plug 10 having body 35. Sloping surface 30 is sized to be forced against edge 23, shown in FIG. 2, to form front seal 14, shown in FIG. 1. The smaller diameter end of sloping surface 30 is less than the diameter of surface 22 and the larger diameter end of surface 30, which intersects surface 33, is greater than the diameter of surface 22. The largest diameter of surface 33 is sized to be less than the diameter of surface 24 (FIG. 2). Wall thickness 37 between inner cup 32 and surfaces 30 and 33 is preferably selected to allow radial expansion of sloping surface 30 when high pressure is applied to plug 10.

Figure 4:
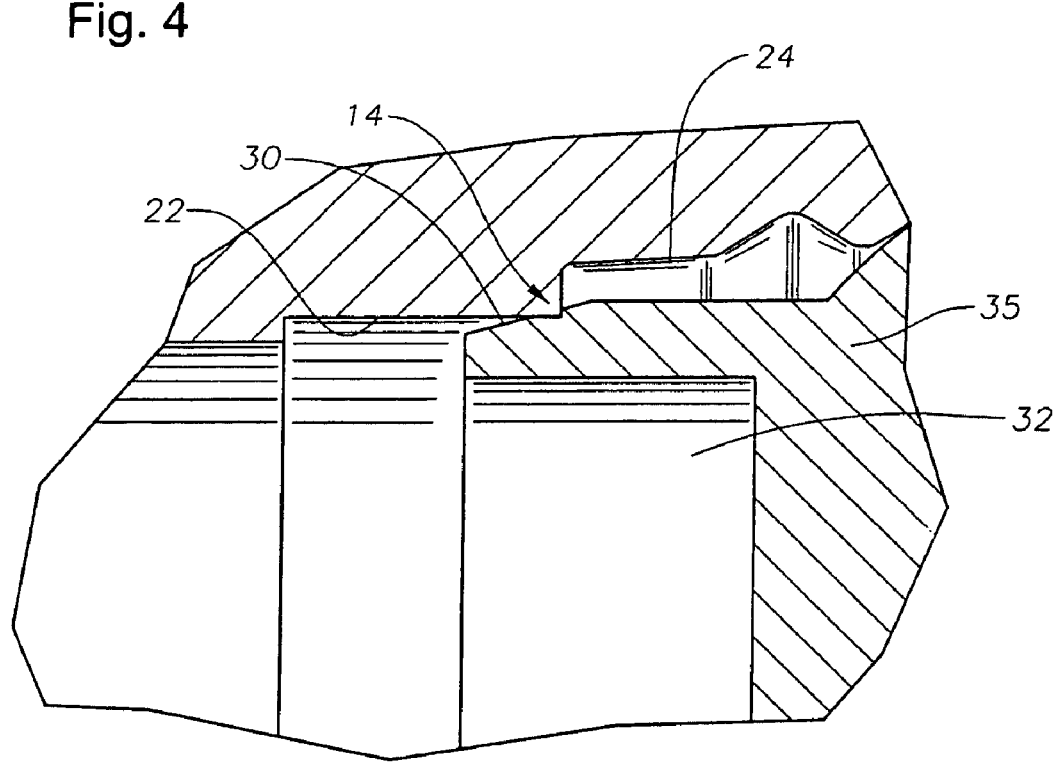
FIG. 4 is a detailed cross-sectional view of a front seal of a plug.

Referring to FIG. 4, a detail cross-section of front seal 14 and how it is formed by edge 23 (FIG. 2) at the intersection of surfaces 22 and 24 is shown. Stress is applied to edge 23 by applying torque to plug 10. Stress will deform surface 30 or edge 23 or both to form first seal 14. Deformation may be beyond the elastic limit of either part. The small cross-sectional area of seal 14 is advantageous as it creates high stress values for sealing high-pressure fluids. Pressure in inside cup 32 also may deform body 35 of the plug and increase stress at first seal 14.

Plug 10 may be formed from any material having physical properties suitable for the temperature and pressure conditions of usage of the plug. For high-pressure usage in metal pressure-containing equipment, plug 10 will normally be formed by machining from a metal galvanically compatible with the material of the pressure body. For example, a suitable material for use in an aluminum pressure body would be aluminum.

Figure 5:
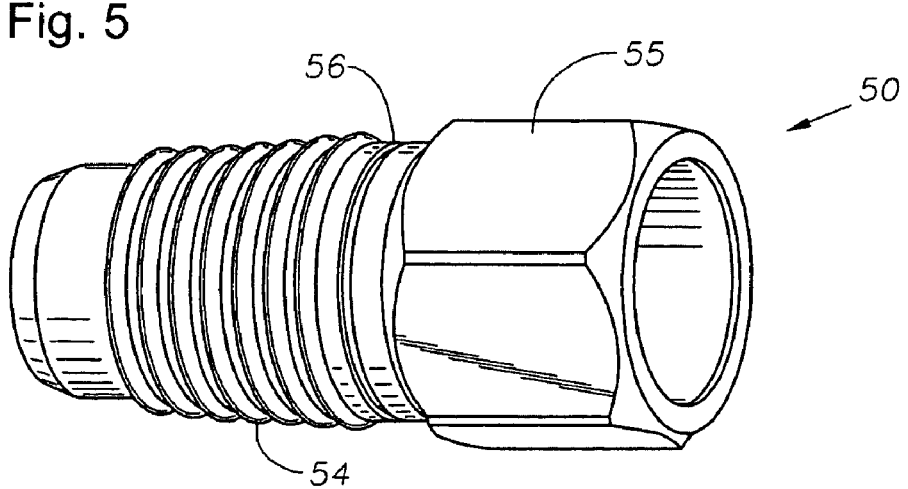
FIG. 5 is a perspective view of a plug having a frangible nut.

Referring to FIG. 5, an alternate embodiment of a plug is illustrated. Instead of a castle head, as shown in FIGS. 1 and 3, the outside end of plug 50, having male threads 54, may have breakaway nut 55. Nut 55 may be adapted to be driven by a standard hexagonal tool, such as an end wrench or a socket wrench. Fracture score 56 is a groove around the body of the plug between nut 55 and threads 54. Fracture score 56 is formed so as to cause breaking away of nut 55 when a preferred torque to seat front seal surface 14 is applied to plug 10.

Figure 6:
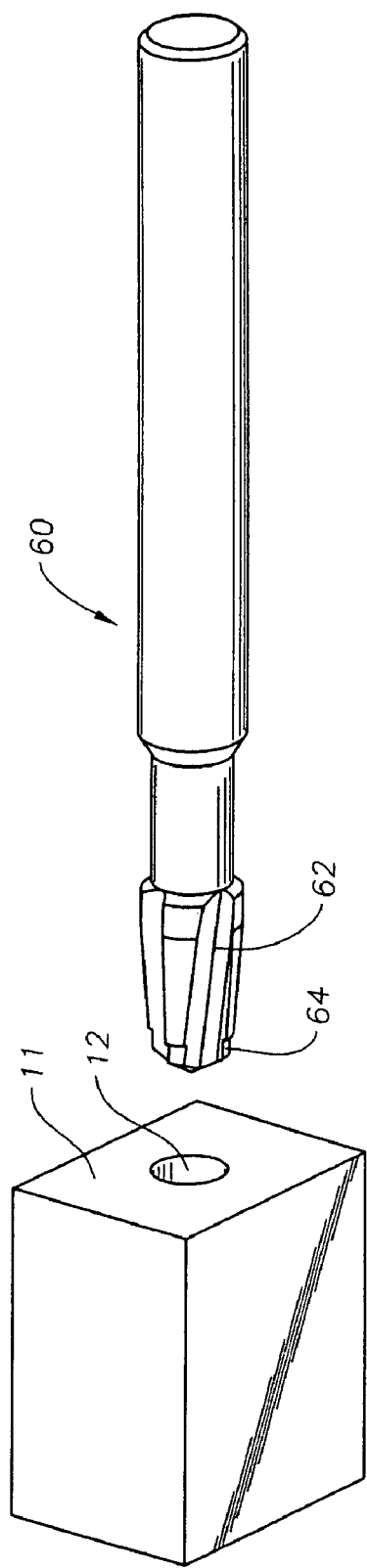
FIG. 6 is a perspective view of a reamer to produce an opening for a plug disclosed herein.

Referring to FIG. 6, one embodiment of apparatus and method for creating a socket for receiving the plug of this disclosure is illustrated. Bore 12 has been formed through wall 11 of a pressure body. Reaming tool 60 may have tapered reaming blade 62 and reaming blade 64, which may produce a cylindrical or tapered hole. The two blades intersect at different radii, so as to create edge 23 (FIG. 2).

Figure 7:
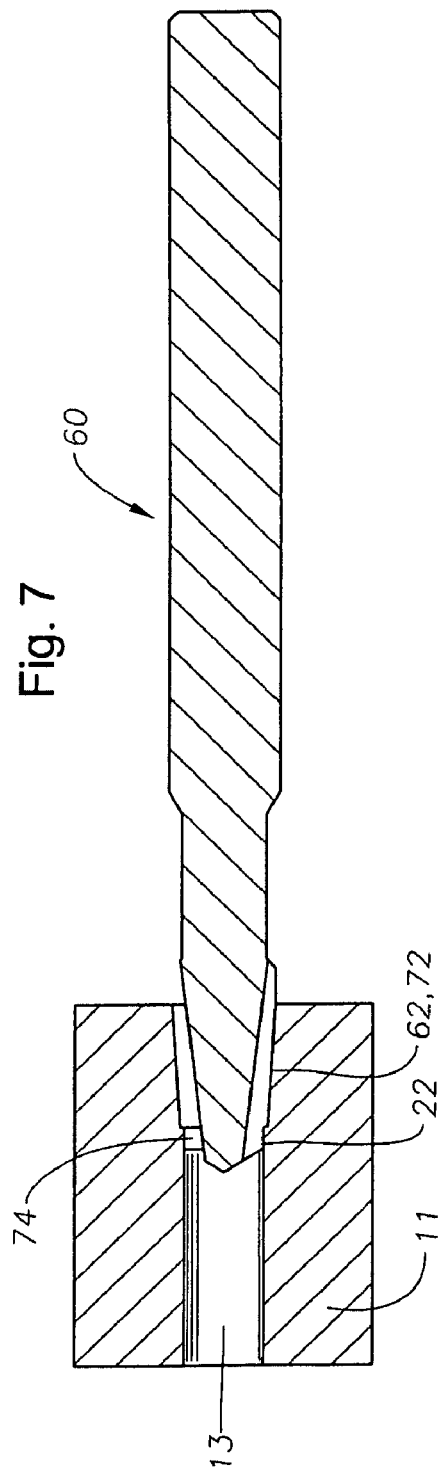
FIG. 7 is a cross-sectional view of a reamer forming a socket for a plug disclosed herein.

Referring to FIG. 7, a torque has been applied to reaming tool 60 as it is pressed into bore 12. Tapered reaming blade 62 turns in bore 12 to remove material from wall body 11, thereby creating tapered surface 72, on which female threads 26 will be formed. Reaming blade 74 turns in bore 12 to form surface 22. Edge 23 (FIG. 2) is formed at the intersection of tapered surface 72 and surface 22. Alternatively, edge 23 may be formed at the intersection of tapered surface 72 and bore 12 and blade 64 may be eliminated or may be a guide for blade 62.

Figure 8:
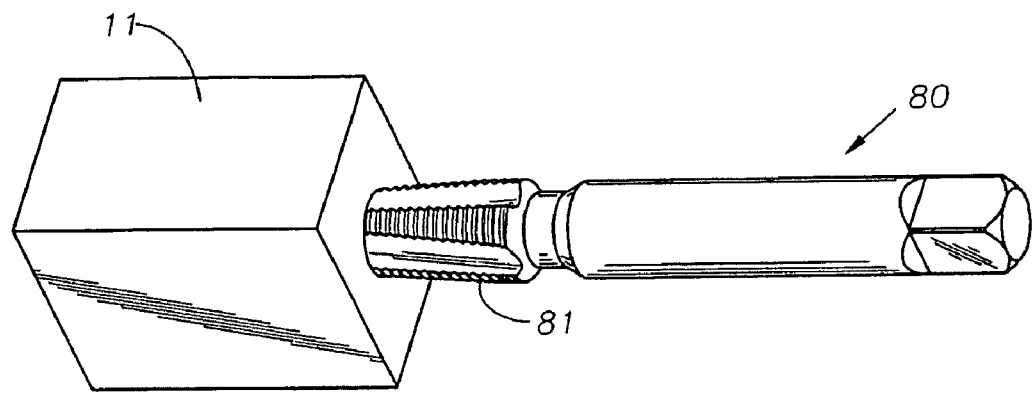
FIG. 8 is a perspective view of apparatus for tapping a hole for a plug disclosed herein.

Illustrated in FIG. 8 is tapping tool 80. Tapping tool 80 has threads 81 to create female threads, such as threads 26 of FIG. 2, in a tapered part of surface 72 of FIG. 7. Torque is applied to tapping tool 80 to form threads having a selected radius, pitch and thread profile. Plugs such as plug 10, described above, will be formed to adapt to threads formed by tapping tool 80.

A plug of this disclosure may be installed by a castle driving tool, a hexagonal wrench or other means. Ball 17 (FIG. 1) may then be driven into outside cup 36 (FIG. 3) using ball guide 16 (FIG. 1) by a direct impact force. A ball installation tool having a concave cup on its distal end and an impact surface on its proximate end may also be used.

FIG. 1 shows ball 17 seated in outside cup 36 of plug 10. Ball 17 is preferably sized to create a radial deformation of the wall of outside cup 36. The diameter of ball 17 may be selected from a range of sizes to afford the optimum sealing characteristics. The size of ball 17 may be selected by tests using a balls having the same elastic properties and different diameters to determine the force necessary to drive each ball into cup 36 of plugs having a selected size and composition.

Although the present invention has been described with respect to specific details, it is not intended that such details should be regarded as limitations on the scope of the invention, except to the extent that they are included in the accompanying claims.

I claim:

1. A plug for forming a seal in a bore through a wall of a pressure body comprising:
   a) a body having a first sloping surface concentric with an inside cup;
   b) the inside cup having an open portion in communication with the pressure body when placed in the bore and a closed portion;
   c) an outside cup having a selected diameter and a wall having a selected wall thickness;
   d) the outside cup having an open portion in communication with the ambient when placed in the bore and a closed portion adjacent the inside cup closed portion;
   e) a segment of tapered male, screw threads on a second sloping surface joining the first sloping surface and concentric with the outside cup.

2. The plug of claim 1, further comprising a body having a diameter selected to enter the outside cup to cause radial expansion of a segment of the outside cup.

3. The plug of claim 1, wherein an outward end of the outside cup includes a plurality of castle head tabs.

4. The plug of claim 1, wherein an outward end of the outside cup includes a breakaway nut.

5. The apparatus of claim 2, wherein the body is a ball.

6. A method for sealing a bore in a wall of a pressure body using the plug of claim 1, comprising:
   a) forming a socket in the bore from outside the wall of the pressure body, the socket having a segment of tapered female threads adapted to mate with the male threads of the plug of claim 1, and intersecting surfaces having larger and a smaller diameters so as to form an edge between the larger and smaller diameters, the edge being adapted to seal against the first sloping surface of the plug; and
   b) placing the plug of claim 1 in the socket so as to form a seal between the plug and the edge.

7. The method of claim 6 further comprising applying a force to cause a body to enter the outside cup of the plug and form a radial seal at the outside cup.

\* \* \* \* \*